Dec. 1, 1925. 1,564,001
G. KRELL
PIPE CLAMP
Filed Dec. 5, 1924 2 Sheets-Sheet 1
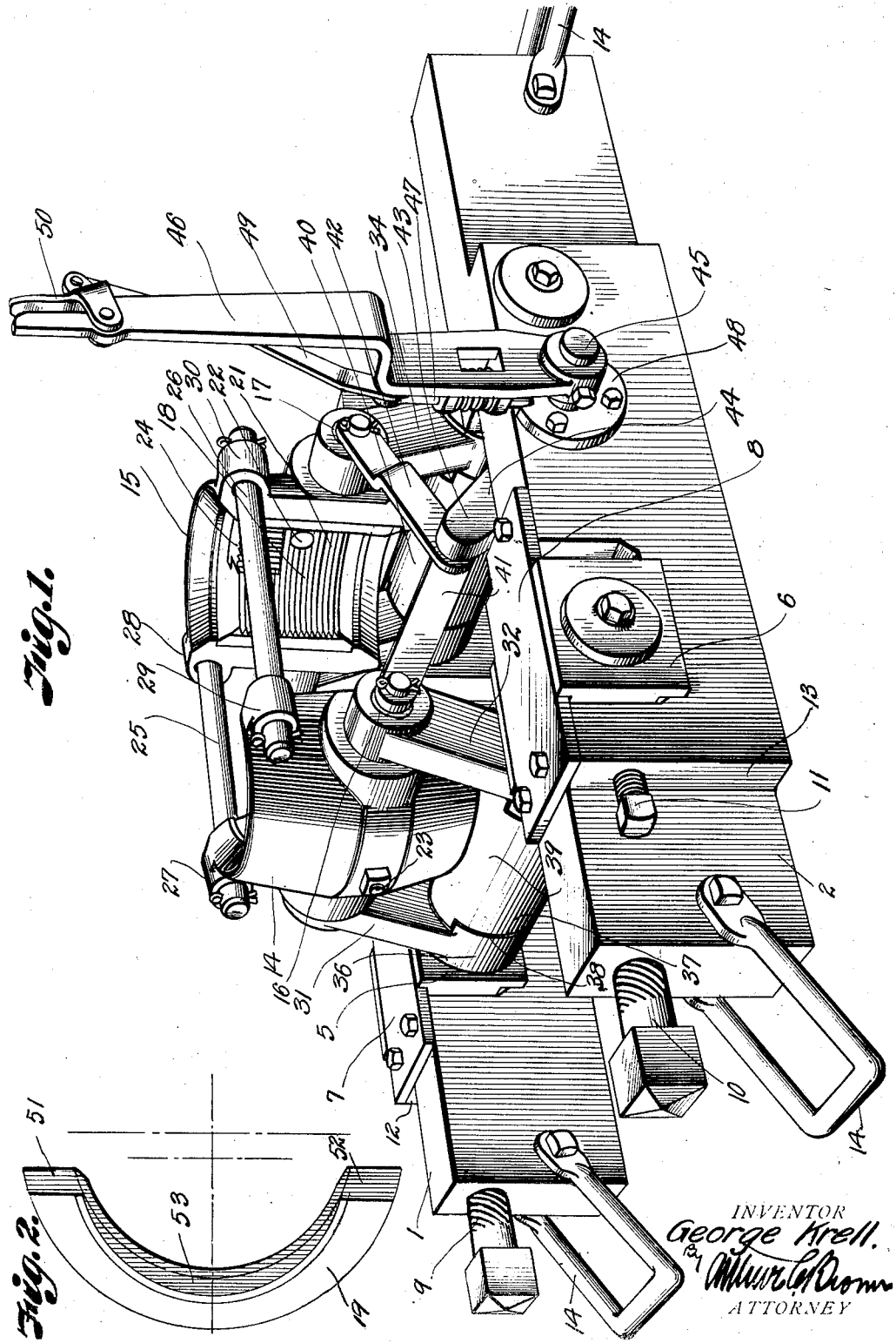

Dec. 1, 1925.　　　　　　　　　　　　　　　　　1,564,001
G. KRELL
PIPE CLAMP
Filed Dec. 5, 1924　　　　2 Sheets-Sheet 2
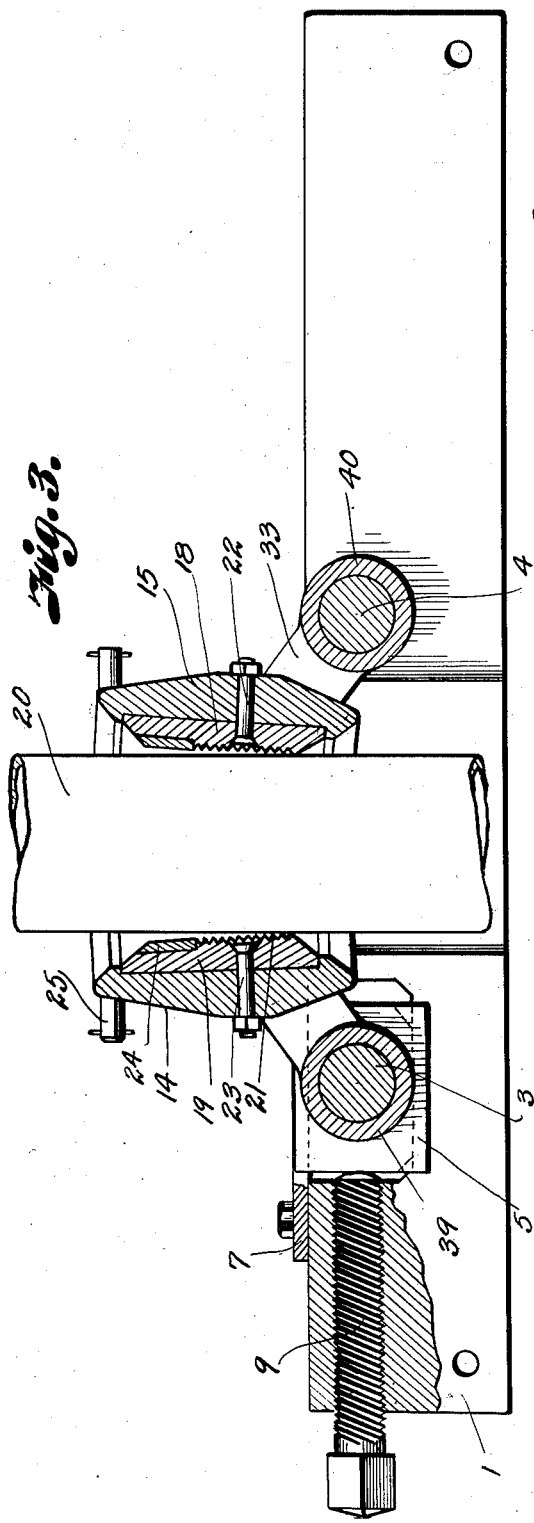
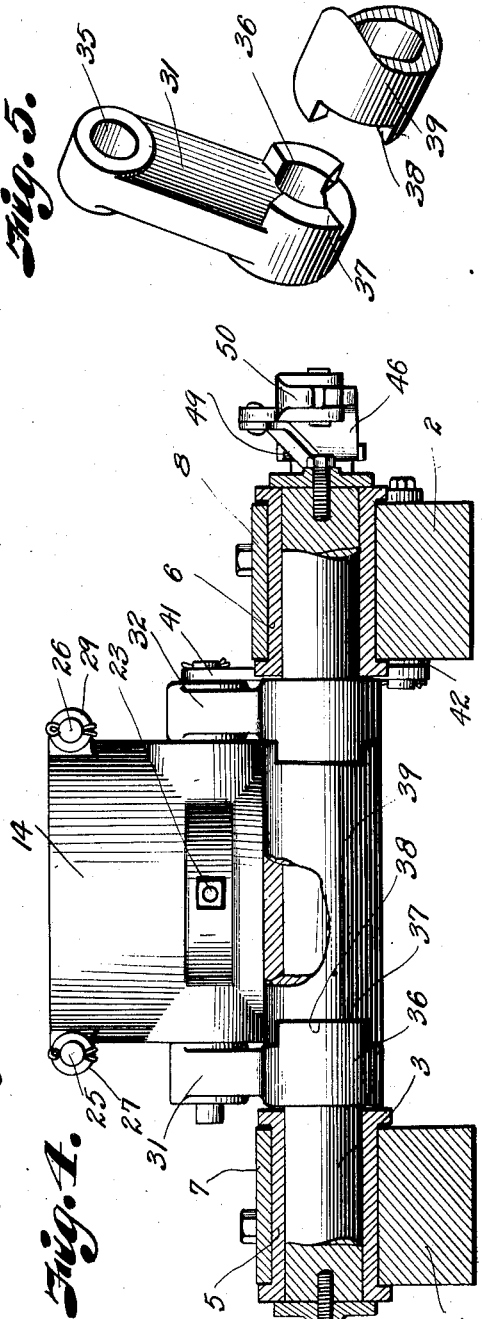
INVENTOR
George Krell
BY
ATTORNEY Patented Dec. 1, 1925.

1,564,001

UNITED STATES PATENT OFFICE.

GEORGE KRELL, OF SAPULPA, OKLAHOMA.

PIPE CLAMP.

Application filed December 5, 1924. Serial No. 754,094.

*To all whom it may concern:*

Be it known that I, GEORGE KRELL, a citizen of Germany, residing at Sapulpa, in the county of Creek and State of Oklahoma, U. S. A., have invented certain new and useful Improvements in Pipe Clamps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to pipe clamps and particularly to a spider adapted for use in connection with rotary and drilling apparatus, the illustrated embodiment of the invention being especially designed to support the drill pipe in an efficient and convenient manner. There is means provided for insuring proper gripping of the pipe by two diametrically oppositely disposed complementary jaws, the jaws being provided with means for preventing turning of the pipe.

Means is provided for opening the jaws to release the pipe when the pipe is to be lowered or elevated. Means is provided for permitting the jaws to be dressed down from time to time as the gripping surfaces become worn.

There are bearing adjustments for the worn or dressed jaw surfaces and there is means provided for maintaining the pivotal members of the jaws in horizontal planes irrespective of the strains upon the jaws and there are certain novel details of construction of importance in a device of the class contemplated, all of which will be specifically described hereinafter, reference being had to the accompanying drawings, in which—

Fig. 1 is a perspective view of a clamping device constructed in accordance with my invention.

Fig. 2 is an end view of one of the clamping slips.

Fig. 3 is a sectional view through two of the jaws and through one of the side bars showing the adjusting screw for adjusting one of the shaft bearings.

Fig. 4 is a cross sectional view, part of the clamping mechanism being shown in elevation, and Fig. 5 is a perspective view of one of the rocker arms and part of the spacing sleeve.

The clamp is illustrated as comprising a substantially rectangular frame consisting of two side bars 1 and 2 connected by the shafts 3 and 4, the shaft 3 being mounted in longitudinally slidable bearings 5 and 6 and the shaft 4 being mounted in fixed bearings in the side bars 1 and 2.

The bearings 5 and 6 slide in notched or cut-out portions in the side bars and they are held against displacement by the cover plates 7 and 8. The bearings 5 and 6 may be adjusted longitudinally by the set screws 9 and 10 which are adapted to bear against the bearing blocks 5 and 6 and if desired additional set or stop screws 11 may be introduced into the offset portions 12 and 13 of the side bars 1 and 2. The purposes of the adjustable bearings will be clearly referred to hereinafter and attention is here called to the fact that the side bars 1 and 2 may be provided with links 14, one for each end of each bar so that the device may be moved into and out of functional position.

The specific embodiment of the invention illustrates a spider adapted for use in rotary drills, the jaws being for the purpose of holding the drill pipe. The jaws are designated 14 and 15 and they are provided with trunnions 16 for the jaw 14 and 17 for the jaw 15. The trunnions are below the longitudinal center of the jaws so that the upper ends of the jaws will tend to spread apart to permit the lower portions of the slips 18 and 19 to initially grip the pipe 20 (see Fig. 3) when the jaws are applied, the lower edges of the slips thus serving as fulcrums to insure the teeth 21 of the slips gripping the pipe to prevent its slipping. The slips are removable and they are held in place by the bolts 22 and 23. The slips are provided with cut-out portions to receive dies or inserts 24. The slips have horizontal teeth and the dies have vertical teeth, therefore the horizontal teeth hold the pipe against longitudinal movement and the vertical teeth of the inserts prevent the pipe from turning in the jaws.

The upper and lower edges of the jaws are bevelled to guide the pipe into the jaws when it is moving in either direction and the jaws are held in substantial parallelism by the rods 25 and 26 which pass through the lugs 27, 28, 29 and 30 as clearly seen in Fig. 1. The trunnions of the jaws engage bearings in rocker arms 31 and 32 for jaw 14 and 33 and 34 for jaw 15. One of the rocker arms 31 is shown in detail in Fig. 5. It has an opening 35 for one of the trunnions of the jaws and an opening or hub 36 for its shaft 3. The hub 36 is provided with a clutch face 37 which engages a complementary clutch face 38 on the spacing member shown as a clutch sleeve 39 carried by the shaft 3. A similar clutch sleeve 40 is on shaft 4. Each arm has a similar clutch face engaging either the clutch sleeve 39 or 40 so that when the jaws move toward and away from the other, a movement of one arm of the group designated 31, 32, 33 and 34 will impart a like movement to the other arm because the arms will be connected together in pairs through the clutch sleeves and spacing members 39 and 40. Therefore the pivotal parts of the jaws 14 and 15 will be in a horizontal plane at all times and the jaws will be maintained in parallelism both by the arms and by the rods 25 and 26.

The jaws have a natural tendency to seat or move together due to the fact that the arms 31, 32, 33 and 34 are inclined upwardly and inwardly at an appropriate angle. An angle of 65° is recommended as giving the best results, that is if the arms normally assume an angle of 65°. When the jaws are in gripping position, it appears that a better gripping effect is had on the pipe so I recommend that the device be designed with this in view although of course I do not wish to be limited to that particular angle for the arms under all conditions.

The trunnions at one side of each jaw are connected to links or toggle levers 41 and 42 which in turn are connected to the end 43 of a toggle actuating arm 44 which is mounted on the stub shaft 45 carried by the side bar 2. The stub shaft 45 carries a hand lever 46 which is provided with a spring actuated dog 47 to engage notches or recesses in the disk or ratchet 48 fixed to the bar 2, the dog 47 being actuated by a link 49 on the elbow lever 50 carried by the lever 46 as is common with ratchet levers. Therefore it will be seen that when the lever 46 is turned from left to right as viewed in Fig. 1, the jaws will be open or spread apart. When the lever is moved in the opposite direction, the jaws will move into pipe gripping position.

The horizontal teeth of the slips will effectively engage the pipes to prevent longitudinal movement but when it is necessary to turn the pipe, for example when new sections are screwed on or taken off, the inserts will come into play since their vertical teeth will grip the pipe with sufficient firmness to prevent rotation of the pipe at that time.

From time to time the jaws become worn, that is the teeth of the slips become worn so it is necessary to dress them or refinish the teeth. This of course removes material which would cause the jaws to be further apart in gripping position than when they were new. The method of redressing the slips can be best explained by reference to Fig. 2 in which the slip 19 is shown with its original material in shaded lines. The shaded lines 51, 52 and 53 indicate material that has been removed from the slips so that while the arc on which the slips are generated is the same as originally provided, the arc is shorter so that there would be a greater gap between the two jaws if some means were not provided for moving the jaws closer together. This is accomplished by screwing up the bolts 9 and 10 so as to slide the bearing blocks or adjustable bearings 5 and 6 closer to the bearings for the shaft 4 to make up for the material removed from the slips. When the adjustment is made, the set screws 11 may be tightened to hold the bearings in their adjusted positions. Therefore it will be seen that even if the slips have been worn, they may be redressed and re-used in an efficient manner.

As illustrated the device is a drill pipe spider for rotary diamond cord drills but some of the features of the invention is applicable for use wherever a clamp for supporting pipe or the like is used so I do not wish to be limited entirely to the use of the device as a spider.

What I claim and desire to secure by Letters-Patent is:—

1. A device of the class described comprising two parallel shafts, means connecting the shafts in spaced relation to provide a frame, pairs of rock arms on the respective shafts, jaws carried by the rock arms, clutch sleeves loose on the shafts between the rock arms of the respective pairs in clutch engagement therewith, and means for varying the distance between the shafts.

2. A device of the class described comprising two shafts, means connecting the shafts in spaced relation, rock arms mounted loosely upon the shafts, spacing members loose on the shafts, between the rock arms and having clutching engagement therewith, jaws carried by the rock arms, and means for varying the distance between the shafts.

3. A device of the class described comprising two shafts, bars connecting the shafts in spaced relation, rock arms on the shafts, jaws carried by the rock arms and means for varying the distance between the shafts, said means comprising sliding bearings in the bars for one of the shafts and independent set screws in the respective bars adjustable to slide the bearings.

4. A device of the class described comprising two shafts, bars connecting the shafts in spaced relation, rock arms on the shafts, jaws carried by the rock arms and means for varying the distance between the shafts, said means comprising sliding bearings in the bars for one of the shafts, set screws in the bars adjustable to slide the bearings and a second set of set screws in the bars to act as stops for the bearings.

5. A device of the class described comprising two shafts, means connecting the shafts in spaced relation, rock arms on the shafts provided with clutch faces, spacing members loose on the shafts between the arms having clutch faces for engagement with the clutch faces on the rock arms and jaws carried by the rock arms.

6. A device of the class described comprising two shafts, means connecting the shafts in spaced relation, a pair of rock arms on each shaft, means loose on each shaft for maintaining the rock arms of each bar in parallelism and jaws carried by the rock arms.

7. A device of the class described comprising two shafts, means connecting the shafts in spaced relation, rock arms loosely mounted upon the shafts, spacing members loose upon the shafts having means for maintaining the arms on each shaft in parallelism and in spaced relation, jaws carried by the rock arms, and means for varying the distance between the shafts.

8. A device of the class described comprising two shafts, means connecting the shafts in spaced relation, rock arms loosely mounted upon the shafts, spacing members loose upon the shafts having means for maintaining the arms on each shaft in parallelism and in spaced relation, jaws carried by the rock arms, means for varying the distance between the shafts and means for spreading the jaws.

In testimony whereof I affix my signature.

GEORGE KRELL.